(12) United States Patent
Sekine et al.

(10) Patent No.: US 12,152,981 B2
(45) Date of Patent: Nov. 26, 2024

(54) STRESS CORROSION CRACKING EVALUATION METHOD FOR STEAM TURBINE

(71) Applicant: MITSUBISHI HEAVY INDUSTRIES, LTD., Tokyo (JP)

(72) Inventors: Yuichi Sekine, Tokyo (JP); Kunio Asai, Tokyo (JP); Yuta Nakatsuchi, Tokyo (JP); Yuichi Iwamoto, Yokohama (JP); Shingo Tamura, Yokohama (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 13 days.

(21) Appl. No.: 17/773,131

(22) PCT Filed: Dec. 9, 2020

(86) PCT No.: PCT/JP2020/045768
§ 371 (c)(1),
(2) Date: Apr. 29, 2022

(87) PCT Pub. No.: WO2021/181773
PCT Pub. Date: Sep. 16, 2021

(65) Prior Publication Data
US 2024/0011890 A1 Jan. 11, 2024

(30) Foreign Application Priority Data
Mar. 13, 2020 (JP) .................. 2020-044151

(51) Int. Cl.
*G01N 17/04* (2006.01)
*G01N 3/02* (2006.01)

(52) U.S. Cl.
CPC ............... *G01N 17/04* (2013.01); *G01N 3/02* (2013.01); *G01N 2203/0064* (2013.01);
(Continued)

(58) Field of Classification Search
CPC .. G01N 17/04; G01N 3/02; G01N 2203/0064; G01N 2203/0218; G01N 2203/0246; G01N 2203/0688
See application file for complete search history.

(56) References Cited

U.S. PATENT DOCUMENTS 8,302,485 B2 * 11/2012 Butterfield ............. G01N 17/00
73/799
2004/0258192 A1 12/2004 Angeliu et al.
(Continued)

FOREIGN PATENT DOCUMENTS

| JP | 56-119783 | 9/1981 |
| JP | 61-231434 | 10/1986 |

(Continued)

OTHER PUBLICATIONS

International Preliminary Report on Patentability issued Sep. 22, 2022 in corresponding International Application No. PCT/JP2020/045768.
(Continued)

*Primary Examiner* — Ryan D Walsh
(74) *Attorney, Agent, or Firm* — WENDEROTH, LIND & PONACK, L.L.P.

(57) ABSTRACT

In a stress corrosion cracking evaluation method for a steam turbine, a sample having a high sensitivity is housed in a sample box of the steam turbine, and a sample breakage time is acquired. Then, based on the sample breakage time, a breakage time of the steam turbine is estimated.

13 Claims, 8 Drawing Sheets

(52) U.S. Cl.
CPC ............... *G01N 2203/0218* (2013.01); *G01N 2203/0246* (2013.01); *G01N 2203/0688* (2013.01)

(56) References Cited

U.S. PATENT DOCUMENTS

| | | |
|---|---|---|
| 2019/0301308 A1 | 10/2019 | Sekine et al. |
| 2022/0090991 A1* | 3/2022 | Biesinger ............... G01N 25/72 |

FOREIGN PATENT DOCUMENTS

| | | |
|---|---|---|
| JP | 2-96637 | 4/1990 |
| JP | 9-304131 | 11/1997 |
| JP | 11-287888 | 10/1999 |
| JP | 2001-305043 | 10/2001 |
| JP | 2005-9491 | 1/2005 |
| JP | 2006-125299 | 5/2006 |
| JP | 5830873 | 12/2015 |
| JP | 2017-146224 | 8/2017 |
| JP | 2019-178824 | 10/2019 |

OTHER PUBLICATIONS

International Search Report issued Feb. 22, 2021 in corresponding International Application No. PCT/JP2020/045768.

\* cited by examiner

STRESS CORROSION CRACKING EVALUATION METHOD FOR STEAM TURBINE

TECHNICAL FIELD

The present disclosure relates to a stress corrosion cracking evaluation method for a steam turbine.

BACKGROUND

In equipment such as a steam turbine, it is known that Stress Corrosion Cracking (SCC) occurs because a constituent member is exposed to moist steam under a high-temperature environment for a long period of time. Since progression of such stress corrosion cracking causes a malfunction in the equipment, it is required to predict a remaining life or an appropriate maintenance implementation timing of the equipment by quantitatively evaluating the degree of progress of corrosion.

For example, JP 2001-305043 A proposes producing a sample (test piece) from the same material as a material of a portion where stress corrosion cracking is a concern, and quantitatively evaluating stress corrosion cracking in an evaluation object part from the crack propagation rate of the sample under the same environment as the evaluation object part.

CITATION LIST

Patent Literature

Patent Document 1: JP2001-305043A

SUMMARY

Technical Problem

In JP 2001-305043 A, the sample is housed under a certain environment assumed from an operating environment of the evaluation object part, and the stress corrosion cracking in the evaluation object part is evaluated based on a corrosion state of the sample. However, there are not a few differences in temperature or wetness between a test environment of the sample and the operating environment of the evaluation object part which is an actual machine. Thus, with such a method, it may be impossible to accurately evaluate the stress corrosion cracking in the evaluation object part which is the actual machine.

Further, in JP 2001-305043 A, the test piece is produced from the same material as the evaluation object part. Thus, in order to evaluate the stress corrosion cracking with such a test piece, a test period is required that is similar to a period required for the stress corrosion cracking to actually occur in the evaluation object part which is the actual machine.

At least one aspect of the present disclosure was made in view of the above, and an object of the present disclosure is to provide a stress corrosion cracking evaluation method for a steam turbine capable of quickly and accurately performing reliable quantitative evaluation of stress corrosion cracking.

Solution to Problem

In order to solve the above problem, a stress corrosion cracking evaluation method for a steam turbine according to an aspect of the present disclosure includes a sample breakage time acquisition step of acquiring a sample breakage time of a sample which is housed in a sample box of the steam turbine and is configured to have a higher sensitivity to stress corrosion cracking than an evaluation object material of the steam turbine, and a breakage time estimation step of estimating a breakage time of the steam turbine based on the sample breakage time.

Advantageous Effects

According to least one aspect of the present disclosure, it is possible to provide a stress corrosion cracking evaluation method for a steam turbine capable of quickly and accurately performing reliable quantitative evaluation of stress corrosion cracking.

DETAILED DESCRIPTION

Figure 1:
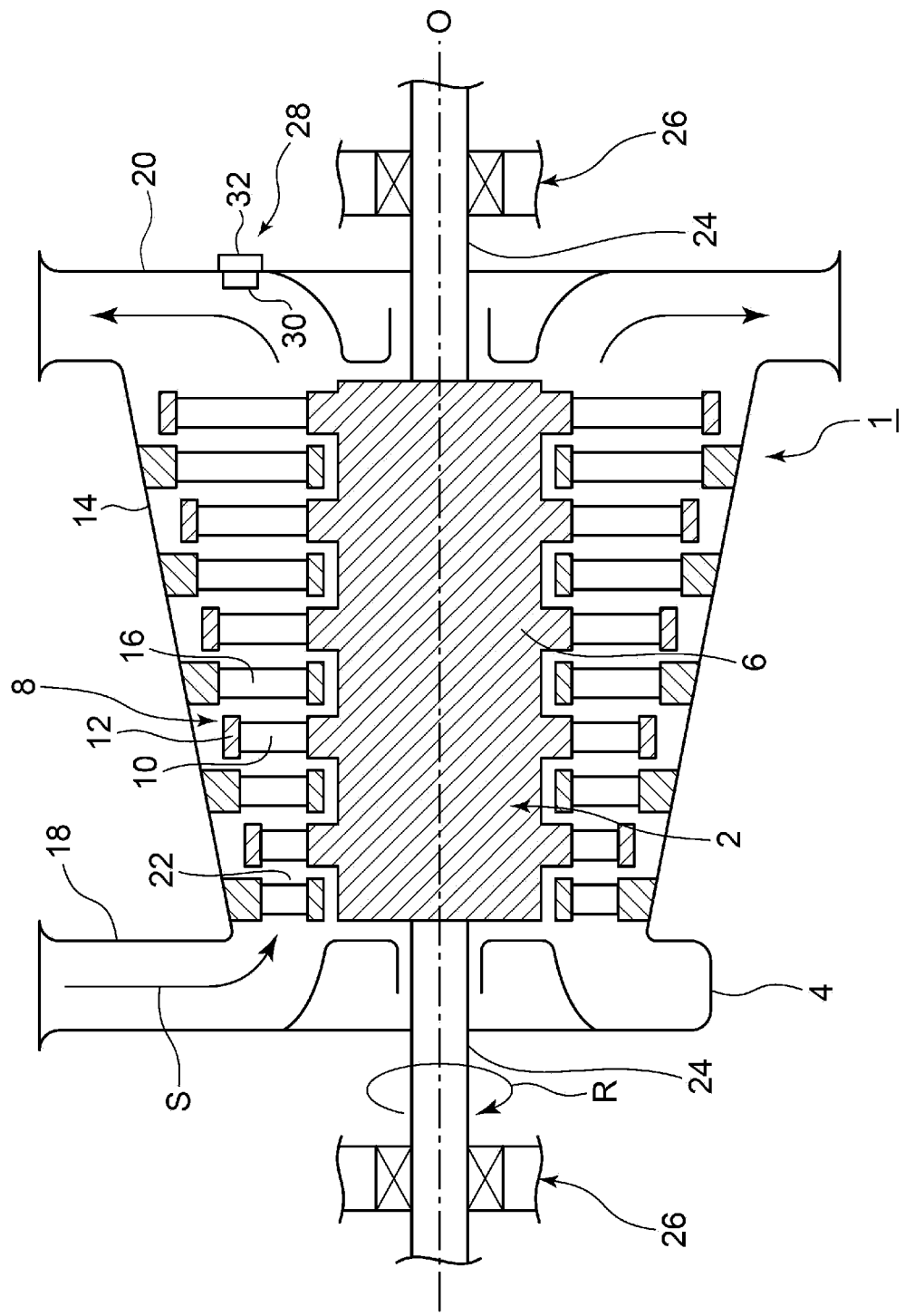
FIG. 1 is a schematic cross-sectional view of a steam turbine.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is a schematic cross-sectional view of a steam turbine 1. The steam turbine 1 includes a rotor 2 for rotating about an axis O, and a casing 4 that houses the rotor 2 to be covered from an outer peripheral side.

The rotor 2 includes a rotor body 6 and a turbine rotor blade 8. The turbine rotor blade 8 is a rotor blade row including a plurality of blade bodies 10 and tip shrouds 12, and a plurality of rows are disposed at regular intervals in the direction of the axis O. The plurality of blade bodies 10 are mounted so as to extend in the radial direction from the rotor body 6 rotating about the axis O in the casing 4, and are disposed at intervals in the circumferential direction of the rotor body 6. Each of the plurality of blade bodies 10 is a member having an airfoil cross-section, as seen in the radial direction. The tip shroud 12 is an annular tip shroud connected to each tip end portion (radially outer end portion) of the plurality of blade bodies 10.

The casing 4 is a nearly cylindrical member disposed so as to cover the rotor 2 from the outer peripheral side. A plurality of stator vanes 16 are disposed on an inner peripheral surface 14 of the casing 4. The plurality of stator vanes 16 are arranged along the circumferential direction of the inner peripheral surface 14 and the direction of the axis O. Further, the turbine rotor blade 8 is disposed so as to enter into a region between the plurality of adjacent stator vanes 16.

Further, the casing 4 is connected to a steam supply pipe 18 for supplying steam S as a working fluid from a steam supply source (not shown) to the steam turbine 1, and a steam discharge pipe 20 connected to a downstream side of the steam turbine 1 to discharge steam. Inside the casing 4, a region where the stator vanes 16 and the turbine rotor blade 8 are arranged forms a main flow passage 22 through which the steam S supplied from the steam supply pipe 18 flows. The steam S flowing through the main flow passage 22 is received by the turbine rotor blade 8, thereby rotary driving the rotor 2 (see an arrow R). The rotation of the rotor 2 is output to the outside via a rotational shaft 24 connected to the rotor body 6. The rotational shaft 24 is supported by a bearing portion 26 to be rotatable with respect to the casing 4.

In addition, the casing 4 is provided with a sample box 28. The sample box 28 includes a space 30 for accommodating a sample 50 used in an evaluation method to be described later, and an opening/closing portion 32 (for example, a manhole or a hand hole) for taking the sample 50 in and out of the space 30. The sample box 28 can be placed at any position of the casing 4 and, for example, during operation of the steam turbine 1, may be disposed at a position in an environment same as or close to that of an evaluation object part of the steam turbine 1. For example, the space 30, where the sample 50 is accommodated, is placed at a position having a temperature and a wetness same as or close to those of the evaluation object part by communicating therewith. In the example of FIG. 1, the sample box 28 is placed at a position adjacent to the main flow passage 22 through which the high-temperature steam S flows, thereby configuring such that the sample 50 housed in the sample box 28 is placed in the environment same as or close to that of a component (the turbine rotor blade 8 or the stator vane 16) which is exposed to the steam S flowing through the main flow passage 22.

Further, the sample box 28 may be disposed at a position of the casing 4 which is easily accessible from the outside, so that a work of taking the sample 50 in and out of the sample box 28 to will be described later becomes easy. In this case, by configuring such that the opening/closing portion 32 (for example, a manhole or a hand hole installed on a flow passage of the steam discharge pipe 20) is adjacent to a passage of the steam turbine 1 through which a worker can enter/exit, it is possible to easily perform the work of taking the sample 50 in and out of the space 30 via the opening/closing portion 32.

Herein, the sample 50 housed in the sample box 28 will be described (hereinafter, samples 50A to 50E will be described as examples of the sample 50, but these will collectively be referred to as the sample 50). By using the sample 50 having such configuration, it is possible to effectively simulate the constituent member of the steam turbine 1 in which stress corrosion cracking may occur.

Figure 2A:
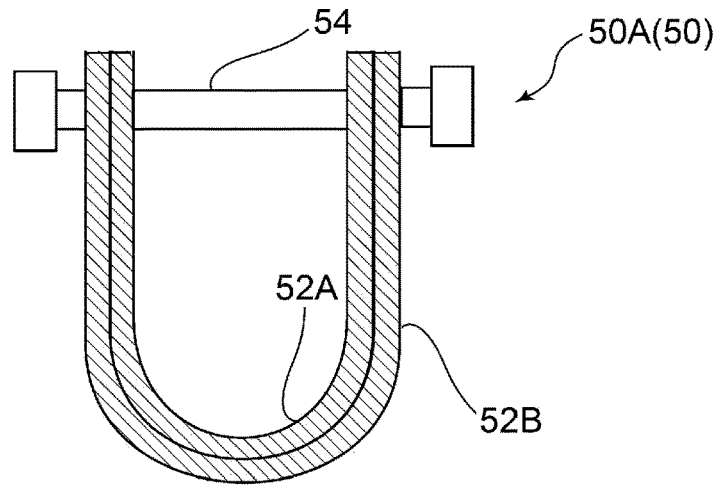
FIG. 2A is a schematic view showing an example of a sample housed in a sample box of FIG. 1.

FIG. 2A is a schematic view showing an example of the sample 50A housed in the sample box 28 of FIG. 1. The sample 50A includes two sample materials 52A and 52B that are in contact with each other and applied with a stress. The sample 50A is a so-called double U-bend test piece, which is configured such that a stress of about a proof stress can be applied to the two sample materials 52A and 52B which are plate-shaped members, by fixing the two sample materials 52A and 52B with a bolt 54 in a curved state. In the sample 50A, the two sample materials 52A and 52B are in close contact with each other so that there is no crevice between them.

The two sample materials 52A and 52B constituting the sample 50A include materials constituting an evaluation object material (for example, the rotor 2, the turbine rotor blade 8, or the like) included in the steam turbine 1. The two sample materials 52A and 52B may be made of the same material. For example, if the rotor 2 of the steam turbine 1 is an evaluation object, the two sample materials 52A and 52B are formed from the same material as the rotor 2.

Alternatively, the two sample materials 52A and 52B may be made of different materials. For example, if the rotor body 6 and the turbine rotor blade 8 constituting the rotor 2 are formed from different materials and come into contact with each other when the rotor body 6 and the turbine rotor blade 8 are combined, contact between the dissimilar materials may cause contact corrosion of dissimilar materials (galvanic corrosion) which has a faster degree of corrosion progress. If such part is the evaluation object, forming the two sample materials 52A and 52B from the materials constituting the rotor body 6 and the turbine rotor blade 8, respectively, it is possible to configure the sample 50 that simulates a state where the dissimilar materials contact each other in the rotor 2.

Figure 2B:
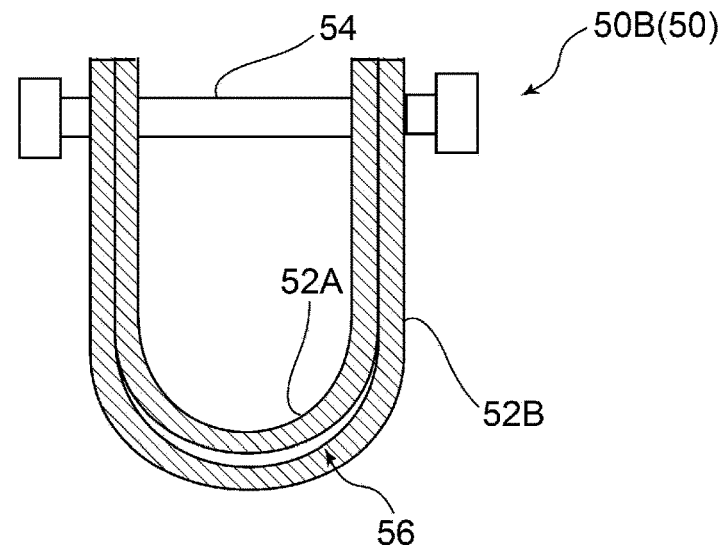
FIG. 2B is a schematic view showing another example of a sample housed in the sample box of FIG. 1.

FIG. 2B is a schematic view showing another example of the sample 50 housed in the sample box 28 of FIG. 1. The sample 50B is configured as a double U-bend test piece like the sample 50A shown in FIG. 2A, but is different from the sample 50A in that a crevice 56 is partially formed between the two sample materials 52A and 52B. By using such a sample 50B, it is possible to perform evaluation in consideration of crevice corrosion that may occur in the steam turbine 1.

Figure 2C:
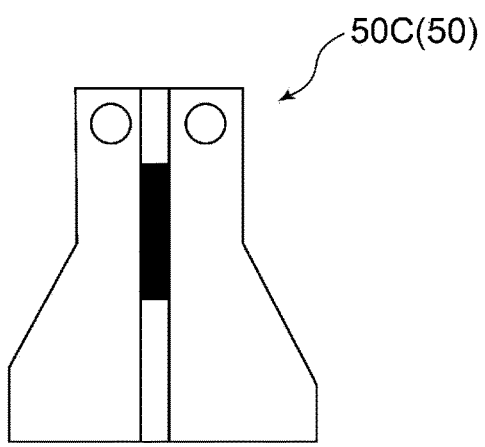
FIG. 2C is a schematic view showing another example of a sample housed in the sample box of FIG. 1.
Figure 2D:
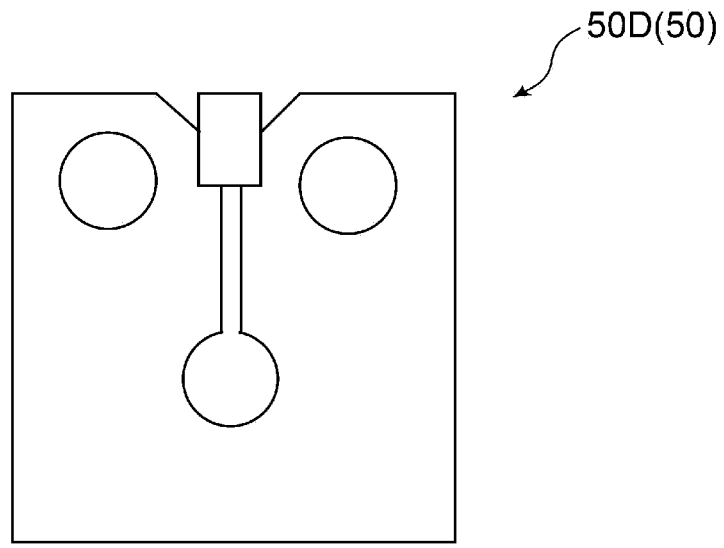
FIG. 2D is a schematic view showing another example of a sample housed in the sample box of FIG. 1.
Figure 2E:
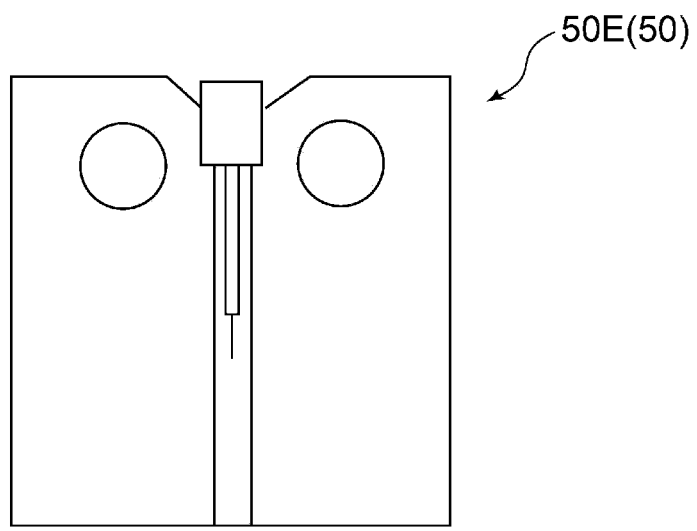
FIG. 2E is a schematic view showing another example of a sample housed in the sample box of FIG. 1.

FIGS. 2C to 2E are each a schematic view showing another example of the sample 50 housed in the sample box 28 of FIG. 1. The sample 50C shown in FIG. 2C is a tapered DCB (Double-Cantilever Beam) test piece, and it is possible to evaluate crack propagation while changing an acting stress depending on the thickness of a wedge. In particular, the tapered DCB test piece has a characteristic that a stress intensity factor hardly changes even if the crack length changes. The sample 50D shown in FIG. 2D is a branch notch CT test piece, and it is possible to evaluate occurrence of a crack by applying a predetermined acting stress by changing the thickness of the wedge. The sample 50E shown in FIG. 2E is a pre-crack CT test piece, and it is possible to evaluate crack propagation while changing the acting stress depending on the thickness of the wedge. In the test piece, the stress intensity factor decreases as the crack length increases.

Further, the sample 50 housed in the sample box 28 may include a plurality of samples having different sensitivities. Generally, the sensitivity of the sample 50 depends on a proof stress, and can be adjusted by, for example, high-strength processing, heat treatment, or the like in production of the sample 50.

Figure 3:
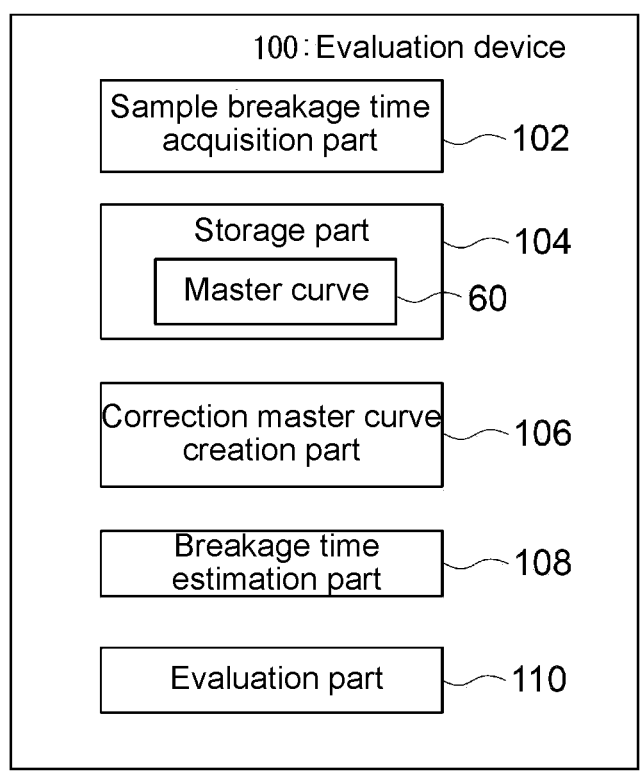
FIG. 3 is a block diagram of an evaluation device 100 for the steam turbine of FIG. 1.

FIG. 3 is a block diagram showing an evaluation device 100 for the steam turbine of FIG. 1. The evaluation device 100 is, for example, an analysis unit for evaluating the steam turbine 1. The evaluation device 100 includes, for example, a Central Processing Unit (CPU), a Random Access Memory (RAM), a Read Only Memory (ROM), a computer-readable storage medium, and the like. Then, a series of processes for realizing the various functions is stored in the storage medium or the like in the form of a program, as an example. The CPU reads the program out to the RAM or the like and executes processing/calculation of information, thereby realizing the various functions. The program may be applied with a configuration where the program is installed in the ROM or another storage medium in advance, a configuration where the program is provided in a state of being stored in the computer-readable storage medium, a configuration where the program is distributed via a wired or wireless communication means, or the like. The computer-readable storage medium is a magnetic disk, a magneto-optical disk, a CD-ROM, a DVD-ROM, a semiconductor memory, or the like.

The evaluation device 100 includes a sample breakage time acquisition part 102 for acquiring a sample breakage time, a storage part 104 for storing a master curve 60, a correction master curve creation part 106 for correcting the master curve 60, a breakage time estimation part 108 for estimating a breakage time of the steam turbine 1, and an evaluation part 110 for evaluating the steam turbine 1 based on the breakage time.

The respective blocks constituting the evaluation device 100 shown in FIG. 3 are described corresponding to functions exhibited when the evaluation method to be described later is performed, and may be integrated with each other as necessary, or may further be subdivided. Further, at least a part of the configuration of the evaluation device 100 may be placed at a position away from the steam turbine 1 which is the evaluation object, by being configured to be communicable via a network. For example, the evaluation device 100 may be disposed in a base station in a remote place capable of communicating with the steam turbine 1 via the network, or may be configured as a cloud server.

Figure 4:
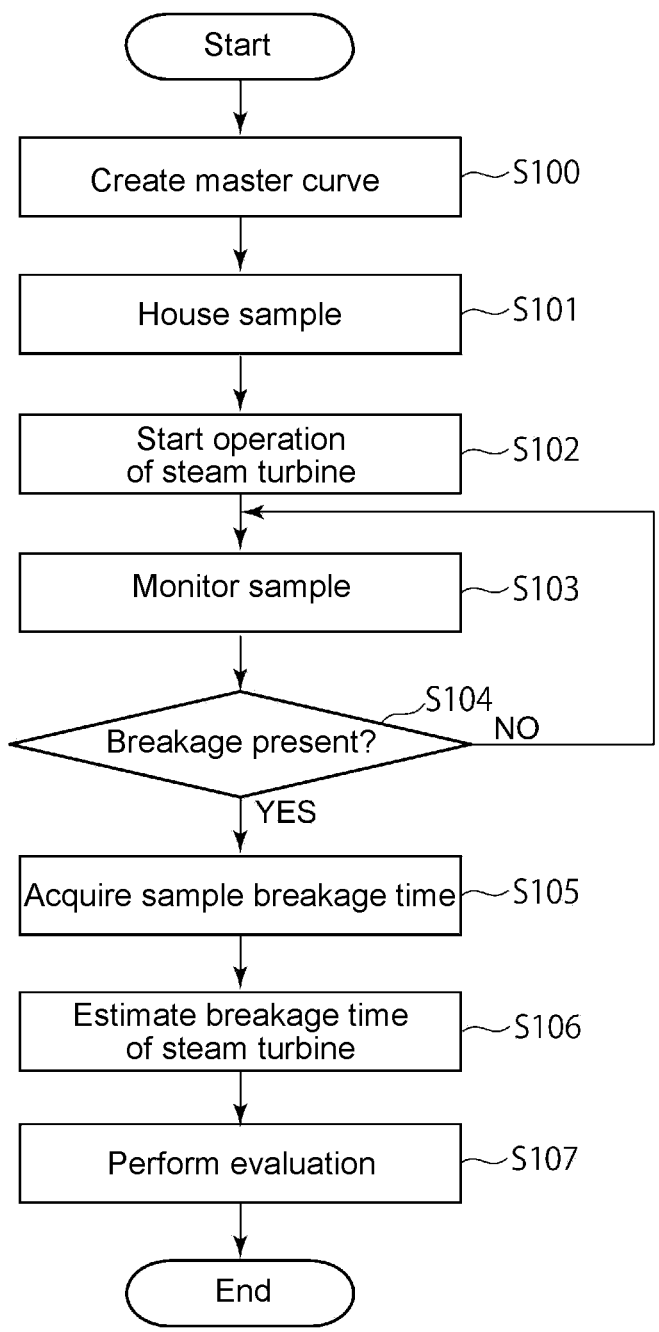
FIG. 4 is a flowchart showing steps of a stress corrosion cracking evaluation method performed by the evaluation device of FIG. 3.

FIG. 4 is a flowchart showing steps of a stress corrosion cracking evaluation method performed by the evaluation device 100 of FIG. 3. The stress corrosion cracking evaluation method to be described below will be described about a case where the stress corrosion cracking evaluation method is performed by using the aforementioned evaluation device 100. However, the stress corrosion cracking evaluation method may be performed by a worker without using the evaluation device 100.

First, the master curve 60 is created which defines a correlation between a standard breakage time and sensitivity to stress corrosion cracking (step S100: master curve creation step). The master curve 60 is created by a rupture test using a plurality of test pieces. The plurality of test pieces used for the rupture test include a material similar to the rotor material, which is an example of the evaluation object material of the steam turbine 1, and use the test pieces having different sensitivities. In the present embodiment, a plurality of test pieces, which have the same shape as the sample 50 described above with reference to FIGS. 2A to 2E, are easy, and are prepared to have different sensitivities. A method for differentiating the sensitivities of the plurality of test pieces generally correlates with sensitivity and proof stress, and is thus performed by performing strong processing or heat treatment.

Then, by conducting the rupture test on the plurality of test pieces having the different sensitivities, the breakage time of each test piece (hereinafter, the breakage time obtained in the rupture test in order to create the master curve 60 will be referred to as a reference breakage time) is obtained. The master curve 60 is created by associating the sensitivity with the reference breakage time thus obtained.

Figure 5:
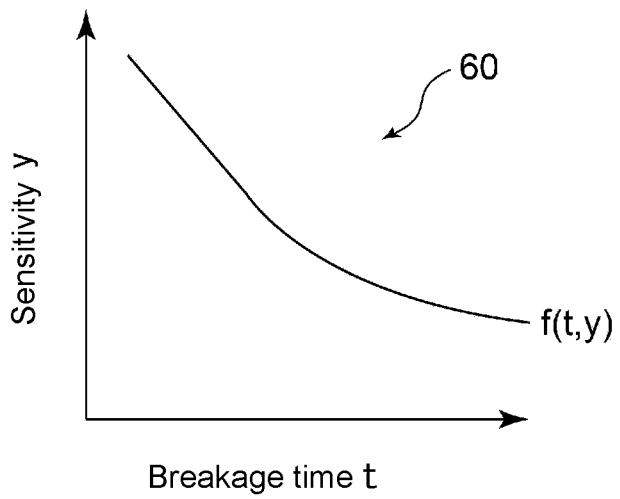
FIG. 5 is an example of a master curve.

FIG. 5 is an example of the master curve 60. The master curve 60 is represented as a function f(t, y) with a sensitivity y and a breakage time t respectively being variables, and shows a tendency that the standard breakage time t decreases as the sensitivity y increases. The master curve 60 thus created is readably stored in the storage part 104. For example, as the sensitivity at the vertical axis of FIG. 5, used is a load stress or the like of a test which is conducted by applying a stress corresponding to the proof stress by using the test piece 50 having the changed proof stress. Further, a material after undergoing sensitization may be used as an index at the vertical axis of FIG. 5.

Subsequently, the sample 50 is housed in the sample box 28 (step S101). The sample 50 housed in the sample box 28 is configured to have higher sensitivity to stress corrosion cracking than the steam turbine 1 which is the evaluation object. More specifically, the sample 50 is prepared whose sensitivity is adjusted by performing strong processing or heat treatment on the sample 50 which has the shape described above with reference to FIGS. 2A to 2E. By thus using the sample 50 which has higher sensitivity to stress corrosion cracking than the steam turbine 1, in the sample 50 housed in the sample box 28, it is possible to cause stress corrosion cracking before the steam turbine 1.

The plurality of samples 50 may be housed in the sample box 28. In this case, the plurality of samples 50 may have different sensitivities by adjusting the proof stress of each sample 50 by performing, for example, high-strength processing, heat treatment, or the like. Further, the plurality of samples 50 may include different forms described above with reference to FIGS. 2A to 2E. By using such a plurality of samples 50, it is possible to consider an influence on the sample breakage time due to the difference in sensitivity or the difference in sample shape, allowing for more detailed evaluation.

Subsequently, the operation of the steam turbine 1 is started with the sample 50 being housed in the sample box 28 (step S102). During operation of the steam turbine 1, corrosion of the steam turbine 1 is progressed by the steam S passing through the main flow passage 22. Then, after the operation of the steam turbine 1 is started, the presence or absence of breakage in the sample 50 is monitored (step S103). The monitoring in step S103 may be performed by, for example, causing the worker to check the state of the sample 50 in the sample box 28 during maintenance of the steam turbine 1, if the maintenance can be performed at intervals sufficiently shorter than an assumed sample breakage time. Further, a broken condition detection sensor may be attached to the sample 50 housed in the sample box 28 to monitor the presence or absence of breakage by acquiring a detection signal of the broken condition sensor. In this case, by configuring the broken condition sensor to be communicable with the evaluation device 100 by wire or wirelessly, it is possible to monitor the broken condition of the sample 50 without actually taking the sample 50 out of the sample box 28. Thus, real-time monitoring is also possible not just during maintenance but also during operation of the steam turbine 1.

If it is determined that there is breakage in the sample 50 (step S104: YES), the sample breakage time acquisition part 102 acquires the sample breakage time (step S105: sample breakage time acquisition step). The sample breakage time is an elapsed time from the start of operation of the steam turbine 1 in step S102 to finding of breakage in the sample 50. For example, if the worker finds breakage in the sample 50 when checking the state of the sample 50 in the sample box 28 during maintenance, an elapsed time from the start of operation of the steam turbine 1 to the check may be regarded as the sample breakage time. Since the sample 50 is configured to have higher sensitivity than the steam turbine 1 as described above, stress corrosion cracking progresses at a timing sufficiently before the steam turbine 1, and it is possible to acquire the sample breakage time required for evaluation.

If a plurality of samples 50 are housed in the sample box 28 and breakage is caused in the plurality of samples 50, the sample breakage time acquisition part 102 may acquire the sample breakage time for each of the samples 50 where breakage is caused.

Subsequently, the breakage time estimation part 108 estimates the breakage time of the steam turbine 1 based on the sample breakage time acquired by the sample breakage time acquisition part 102 (step S106: breakage time estimation step). A specific method by the breakage time estimation part 108 will be described later, and the sample breakage time is acquired from the sample 50 housed in the sample box 28 of the steam turbine 1 which is the actual machine to be the evaluation object, and is thus reflects an influence which is concerned with an operational condition including a temperature or a wetness of the actual steam turbine. Thus, by estimating the breakage time of the steam turbine 1 based on such sample breakage time, it is possible to accurately evaluate the steam turbine.

Subsequently, the evaluation part 110 evaluates a remaining life or a maintenance timing of the steam turbine 1 based on the breakage time estimated in step S106 (step S107: evaluation step). More specifically, the evaluation part 110 obtains the remaining life of the steam turbine 1 as a difference between the operating time of the steam turbine 1 up to now and the breakage time estimated in step S106. Further, the evaluation part 110 obtains the remaining life for each component of the steam turbine 1 and obtains, based on the remaining life, an execution timing of maintenance work such as repair/replacement of each component. Such evaluation result is effective in drawing up a maintenance plan for preventing stress corrosion cracking in the steam turbine 1 in advance.

Figure 6:
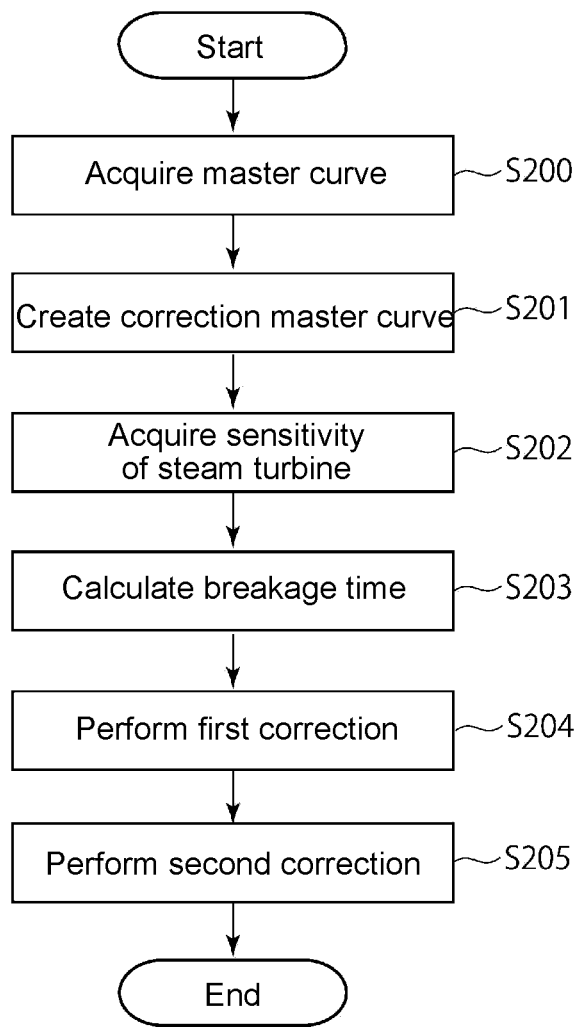
FIG. 6 is a sub-flowchart of step S106 in FIG. 4.

Subsequently, a method for estimating the breakage time of the steam turbine 1 in the breakage time estimation step of step S106 will be described in detail. FIG. 6 is a sub-flowchart of step S106 in FIG. 4.

First, the breakage time estimation part 108 acquires the master curve 60 stored in the storage part 104 (step S200). As described above with reference to FIG. 5, the master curve 60 is stored in the storage part 104 in advance as a function that defines the correlation between the sensitivity and the standard breakage time.

Figure 7:
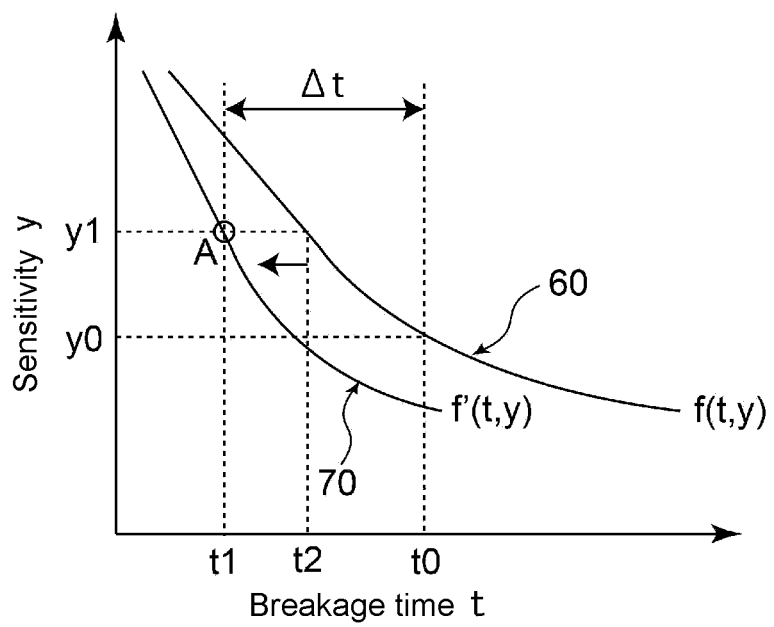
FIG. 7 is a graph showing a comparison between the master curve and a correction master curve.

Subsequently, the breakage time estimation part 108 creates a correction master curve 70 by correcting the master curve 60 acquired in step S200, based on the sample breakage time acquired by the sample breakage time acquisition part 102 and the sensitivity of the sample 50 corresponding to the sample breakage time (step S201). FIG. 7 is a graph showing a comparison between the master curve 60 and the correction master curve 70. In FIG. 7, the horizontal axis indicates the breakage time t and the vertical axis indicates the sensitivity y (proof stress), and the uncorrected master curve 60 acquired from the storage part 104 is indicated as the function f(t, y). Further, FIG. 7 shows a measurement point A(t1, y1) which is specified by the sample breakage time acquired by the sample breakage time acquisition part 102 and the sensitivity of the sample 50 corresponding to the sample breakage time. The correction master curve 70 can be obtained by:

$$f(t,y)=f(t\times t2/t1, y)$$

where t2 is a breakage time corresponding to a sensitivity y1 on the master curve 60.

That is, the correction in step S201 is performed so as to adjust the magnification of the master curve 60 in the horizontal axis direction, such that the master curve 60 passes through the measurement point A(t1, y1). There is a not a few difference between the environment (reference environment) in which the master curve 60 is created and the operating environment of the actual steam turbine 1. However, by thus correcting the master curve 60 based on an actual measurement point (t1, y1), it is possible to create the correction master curve 70 in consideration of an influence of the difference between the environment (reference environment) in which the master curve 60 is created and the operating environment of the actual steam turbine 1.

Figure 8:
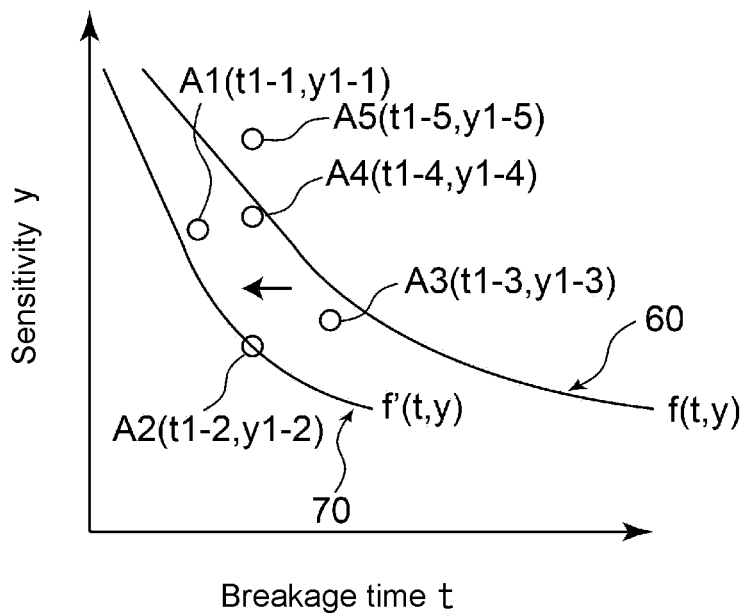
FIG. 8 is a graph showing a comparison between the master curve and the correction master curve in a case where a plurality of measurement points exist.

If the plurality of samples 50 having the different sensitivities are housed in the sample box 28 and a plurality of measurement points corresponding to the respective samples 50 exist, the master curve 60 may be corrected based on the sample breakage time and the sensitivity of the sample corresponding to the sample 50 with the fastest progress of stress corrosion cracking. FIG. 8 is a graph showing a comparison between the master curve 60 and the correction master curve 70 in a case where a plurality of measurement points A1(t1−1, y1−1), A2(t1−2, y1−2), . . . exist. In the example of FIG. 8, the sample 50 having the fastest progress of stress corrosion cracking is specified as, for example, the measurement point A2(t1−2, y1−2) located on a leftmost lower side among the plurality of measurement points A1(t1−1, y1−1), A2(t1−2, y1−2), . . . . With reference to the measurement point A2(t1−2, y1−2) thus specified, by creating the correction master curve 70 as in the case of FIG. 7, it is possible to estimate the breakage time of the steam turbine 1 with high tolerance. Thus, it is possible to evaluate the steam turbine 1 with higher reliability.

Subsequently, the breakage time estimation part 108 acquires the sensitivity of the steam turbine 1 which is the evaluation object (step S202). Since the sensitivity generally corresponds to a strength, the sensitivity may be obtained through calculation by acquiring the strength of the steam turbine 1 in step S202.

Subsequently, the breakage time estimation part 108 obtains the breakage time which corresponds to the sensitivity of the steam turbine 1 acquired in step S202, by using the correction master curve 70 created in step S201 (step S203). Describing with reference to FIG. 7, where y0 is a sensitivity of the steam turbine 1, a breakage time t0 of the steam turbine 1 is obtained based on the correction master curve 70.

Subsequently, the breakage time estimation part 108 performs first correction on the breakage time t0 obtained in step S203, based on a reference temperature corresponding to the master curve 60 and a temperature during operation of the steam turbine 1 (step S204: first correction step). The first correction is first performed by calculating a time evaluation base value Δt based on the breakage time t0 obtained in step S203. As shown in FIG. 7, the time evaluation base value Δt is calculated as a difference between the breakage time t0 obtained in step S203 and the sample breakage time which is the current time (since the present step is at a point in time when the sample breakage time is acquired, the sample breakage time is the current time).

In the first correction, the time evaluation base value Δt is corrected based on the reference temperature corresponding to the master curve 60 and the temperature during operation of the steam turbine 1. For example, a test environment temperature T1 when the master curve 60 is created and parameters X1, X2 corresponding to a temperature T2 of the actual steam turbine 1 are obtained by using the following Clark's equations (coefficients A, B, C), respectively (a is a crack length, σ0.2 is a 0.2% proof stress (or yield strength), and the coefficients A, B, C are constants defined based on the conditions of materials or the like):

$$X1 = \ln(da/dt) = -A - B/T1 + C\sigma 0.2$$

$$X2 = \ln(da/dt) = -A - B/T2 + C\sigma 0.2$$

If T2>T1, a first correction value Δt' of the time evaluation base value Δt is obtained by dividing the time evaluation base value Δt by a ratio (X2/X1) of X. The first correction value Δt' thus calculated can consider the influence of the difference between the reference temperature of the master curve 60 and the temperature during operation of the steam turbine 1 which is the actual machine, making it possible to evaluate the steam turbine more accurately.

Figure 9:
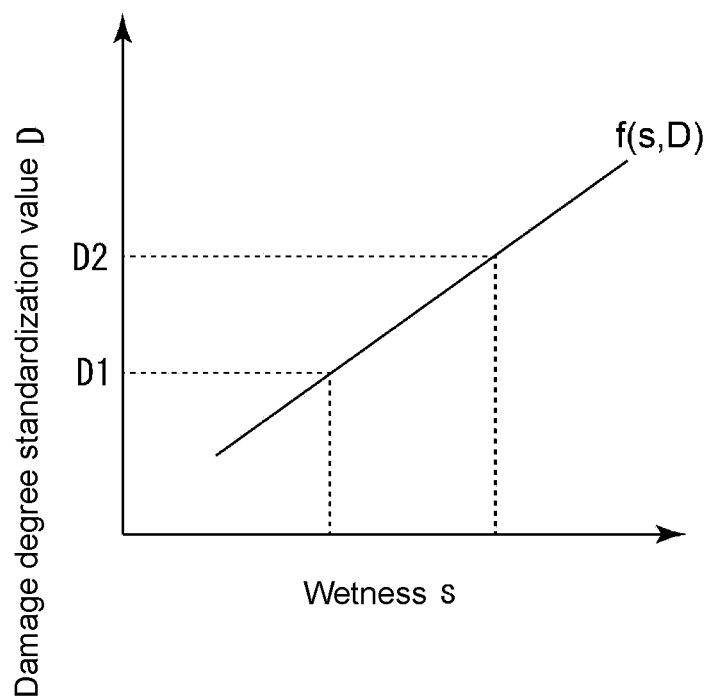
FIG. 9 is a graph showing a characteristic function that defines a correlation of a damage degree standardization value with respect to a wetness.

The first correction value Δt' of the time evaluation base value obtained in step S204 further undergoes second correction based on a reference wetness corresponding to the master curve 60 and a wetness during operation of the steam turbine 1 (Step S205: second correction step). In the second correction, a characteristic function f(s, D) is created in advance which defines a correlation of a damage degree standardization value D with respect to a wetness s. FIG. 9 is a graph showing the characteristic function f(s, D) that defines the correlation of the damage degree standardization value D with respect to the wetness s. Herein, by using a test environment damage degree D1 when the master curve 60 is created and an assumed damage degree D2 of the steam turbine 1 which is the actual machine, the ratio of D1 and D2 is evaluated. If D2>D1, a second correction value T" is obtained by dividing the first correction value Δt' of the time evaluation base value by a ratio (D2/D1) of D. By thus obtaining the second correction value T", it is possible to consider the influence of the difference between the reference wetness of the master curve 60 and the wetness during operation of the steam turbine 1 which is the actual machine, making it possible to evaluate the steam turbine more accurately.

In the embodiment, the case is exemplified where the first correction is performed in step S204 and then the second correction is performed in step S205. However, the first correction may be performed after the second correction, or only one of the first correction or the second correction may be performed. Further, in step S106, the first correction and the second correction may not be performed, and the breakage time t0 itself calculated in step S3 may be output as an estimation result.

As described above, according to the above-described embodiment, by using the sample 50 which has higher sensitivity to stress corrosion cracking than the steam turbine 1, in the sample 50 housed in the sample box 28, stress corrosion cracking occurs before the steam turbine 1. Thus, by using the sample 50 which is housed in the sample box 28 provided in the steam turbine 1, it is possible to acquire the sample breakage time at the timing sufficiently before stress corrosion cracking actually occurs in the steam turbine 1, and to estimate the breakage time of the steam turbine 1 based on the sample breakage time. Further, the sample breakage time is acquired from the sample 50 housed in the sample box 28 of the steam turbine 1 which is the actual machine to be the evaluation object. Since the sample breakage time reflects the influence which is concerned with the operational condition including the temperature or the wetness of the actual steam turbine 1, it is possible to accurately evaluate the steam turbine 1.

As for the rest, without departing from the spirit of the present disclosure, it is possible to replace the constituent elements in the above-described embodiments with known constituent elements, respectively, as needed and further, the above-described embodiments may be combined as needed.

The contents described in the above embodiments would be understood as follows, for instance.

(1) A stress corrosion cracking evaluation method for a steam turbine according to an aspect includes a sample breakage time acquisition step (such as step S105 of the above-described embodiment) of acquiring a sample breakage time of a sample (such as the sample 50 of the above-described embodiment) which is housed in a sample box (such as the sample box 28 of the above-described embodiment) of the steam turbine (such as the steam turbine 1 of the above-described embodiment) and is configured to have a higher sensitivity to stress corrosion cracking than an evaluation object material of the steam turbine, and a breakage time estimation step (such as step S106 of the above-described embodiment) of estimating a breakage time of the steam turbine based on the sample breakage time.

With the above aspect (1), by using the sample which has the higher sensitivity to the stress corrosion cracking than the evaluation object material (such as the rotor material, rotor blade material, or the like) of the steam turbine, in the sample housed in the sample box, the stress corrosion cracking occurs before the steam turbine. Thus, by using the sample which is housed in the sample box provided in the steam turbine, it is possible to acquire the sample breakage time at the timing sufficiently before the stress corrosion cracking actually occurs in the steam turbine, and to estimate the breakage time of the steam turbine based on the sample breakage time. Further, the sample breakage time is acquired from the sample housed in the sample box of the steam turbine which is the actual machine to be the evaluation object. Since such sample breakage time reflects the influence which is concerned with the operational condition including the temperature or the wetness of the actual steam turbine, it is possible to accurately evaluate the steam turbine.

(2) In another aspect, in the above aspect (1), the sample has a higher strength than the evaluation object material.

With the above aspect (2), by increasing the strength of the evaluation object material, it is possible to make the sensitivity of the sample higher than that of the evaluation object material.

(3) In another aspect, in the above aspect (1) or (2), the breakage time estimation step includes a correction master curve creation step (such as step S201 of the above-described embodiment) of creating a correction master curve (such as the correction master curve 70 of the above-described embodiment) by correcting a master curve (such as the master curve 60 of the above-described embodiment) defining a correlation between the sensitivity and a standard breakage time with the sensitivity of the sample and the sample breakage time used in the first step, and a breakage time specification step (such as step S203 of the above-described embodiment) of specifying the breakage time corresponding to a design strength of the steam turbine, based on the correction master curve.

With the above aspect (3), with regard to the material forming the steam turbine, the master curve defining the correlation between the sensitivity and the standard breakage time under the reference environment is prepared in advance. Since there is not a few difference between the reference environment of the master curve and the operating environment of the actual steam turbine, the master curve is corrected by the sample breakage time and the sensitivity of the sample housed in the sample box of the steam turbine. By obtaining the breakage time of the steam turbine based on the master curve thus corrected, it is possible to accurately evaluate the steam turbine.

(4) In another aspect, in the above aspect (3), the sample breakage time acquisition step includes acquiring the sample breakage time for a plurality of samples which are different in the sensitivity, and the correction master curve creation step includes creating the correction master curve by correcting the master curve based on the sample breakage time and the sensitivity of the sample corresponding to the sample with a fastest progress of the stress corrosion cracking.

With the above aspect (4), the sample breakage time is acquired for each of the plurality of samples housed in the sample box. Then, among these samples, the sample is selected whose progress of the stress corrosion cracking determined by the sensitivity and the sample breakage time is the fastest, and the master curve is corrected by using the sensitivity and the sample breakage time corresponding to the concerned sample. Thus, it is possible to estimate the breakage time of the steam turbine with high tolerance, making it possible to evaluate the steam turbine with higher reliability.

(5) In another aspect, in the above aspect (3) or (4), the stress corrosion cracking evaluation method for the steam turbine further includes a master curve creation step (such as step S100 of the above-described embodiment) of creating the master curve by conducting a rupture test by using a plurality of test pieces including a similar material to the steam turbine and having different sensitivities.

With the above aspect (5), by using the plurality of test pieces having the different sensitivities for the similar material to the steam turbine which is the evaluation object, it is possible to create the master curve defining the correlation between the susceptibility and the standard breakage time.

(6) In another aspect, in any one of the above aspects (1) to (5), the stress corrosion cracking evaluation method for the steam turbine further includes a first correction step (such as step S204 of the above-described embodiment) of correcting the breakage time based on a reference temperature corresponding to the master curve and a temperature during operation of the steam turbine.

With the above aspect (6), the breakage time of the steam turbine estimated based on the sample breakage time is corrected based on the reference temperature of the master curve and the temperature during operation of the steam turbine which is the actual machine. Thus, it is possible to consider the influence of the difference between the reference temperature of the master curve and the temperature during operation of the steam turbine which is the actual machine, and it is possible to evaluate the steam turbine more accurately.

(7) In another aspect, in any one of the above aspects (1) to (6), the stress corrosion cracking evaluation method for the steam turbine further includes a second correction step (such as step S205 of the above-described embodiment) of correcting the breakage time based on a reference wetness corresponding to the master curve and a wetness during operation of the steam turbine.

With the above aspect (7), the breakage time of the steam turbine estimated based on the sample breakage time is corrected based on the reference wetness of the master curve and the wetness during operation of the steam turbine which is the actual machine. Thus, it is possible to consider the influence of the difference between the reference wetness of the master curve and the wetness during operation of the steam turbine which is the actual machine, and it is possible to evaluate the steam turbine more accurately.

(8) In another aspect, in any one of the above aspects (1) to (7), the sample includes two sample materials (such as the sample materials 52A and 52B of the above-described embodiment) which at least partially contact each other and are applied with a stress.

With the above aspect (8), by using the sample having such configuration, it is possible to effectively simulate the constituent member of the steam turbine in which the stress corrosion cracking occurs.

(9) In another aspect, in the above aspect (8), the two sample materials respectively include different materials included in the steam turbine.

With the above aspect (9), by configuring such that the two sample materials constituting the sample respectively include the different materials included in the steam turbine, evaluation is possible which considers contact corrosion of dissimilar materials (galvanic corrosion) that may occur in the steam turbine.

(10) In another aspect, in the above aspect (8) or (9), a crevice (such as the crevice 56 of the above-described embodiment) is formed between the two sample materials.

With the above aspect (10), since the crevice is formed between the two sample materials constituting the sample, evaluation is possible which considers crevice corrosion that may occur in the steam turbine.

(11) In another aspect, in any one of the above aspects (1) to (10), the sample is a double U-bend test piece (such as the sample 50A, 50B of the above-described embodiment), a tapered DCB test piece (such as the sample 50C of the above-described embodiment), a blunt notch CT test piece (such as the sample 50D of the above-described embodiment), or a pre-crack CT test piece (such as the sample 50E of the above-described embodiment).

With the above aspect (11), by using these test pieces as the samples, it is possible to suitably evaluate the steam turbine by the method according to each of the above aspects.

(12) In another aspect, in any one of the above aspects (1) to (11), the sample breakage time acquisition step includes acquiring the sample breakage time based on a detection signal of a broken condition detection sensor provided in the sample.

With the above aspect (12), since it is possible to confirm the presence or absence of the stress corrosion cracking in the sample based on the detection signal of the broken condition detection sensor, it is possible to acquire the sample breakage time without taking the sample out of the sample box.

(13) In another aspect, in any one of the above aspects (1) to (12), the stress corrosion cracking evaluation method for the steam turbine further includes an evaluation step (such as step S107 of the above-described embodiment) of evaluating a remaining life or a maintenance timing of the steam turbine based on the breakage time.

With the above aspect (13), by evaluating the remaining life or the maintenance timing of the steam turbine based on the breakage time of the steam turbine estimated by the method according to each of the above aspects, it is possible to effectively prevent the stress corrosion cracking in the steam turbine in advance.

REFERENCE SIGNS LIST

1 Steam turbine
2 Rotor
4 Casing
6 Rotor body
8 Turbine rotor blade
10 Blade body
12 Tip shroud
14 Inner peripheral surface
16 Stator vane
18 Steam supply pipe
20 Steam discharge pipe
22 Main flow passage
24 Rotational shaft
26 Bearing portion
28 Sample box
30 Space
32 Opening/closing portion
50 Sample
52A, 52B Sample material
54 Bolt
56 Crevice
60 Master curve
70 Correction master curve
100 Evaluation device
102 Sample breakage time acquisition part
104 Storage part
106 Correction master curve creation part
108 Breakage time estimation part
110 Evaluation part
S Steam

The invention claimed is:

1. A stress corrosion cracking evaluation method for a steam turbine, comprising:
a sample breakage time acquisition step of acquiring a sample breakage time of a sample which is housed in a sample box of the steam turbine and is configured to have a higher sensitivity to stress corrosion cracking than an evaluation object material of the steam turbine; and
a breakage time estimation step of estimating a breakage time of the steam turbine based on the sample breakage time.

2. The stress corrosion cracking evaluation method according to claim 1,
wherein the sample has a higher yield strength than the evaluation object material.

3. The stress corrosion cracking evaluation method according to claim 1,
wherein the breakage time estimation step includes:
a correction master curve creation step of creating a correction master curve by correcting a master curve defining a correlation between the sensitivity and a standard breakage time with the sensitivity of the sample and the sample breakage time used in the sample breakage time acquisition step; and
a breakage time specification step of specifying the breakage time corresponding to a design strength of the steam turbine, based on the correction master curve.

4. The stress corrosion cracking evaluation method according to claim 3, wherein:
the sample breakage time acquisition step includes acquiring the sample breakage time for a plurality of samples which are different in the sensitivity; and
the correction master curve creation step includes creating the correction master curve by correcting the master curve based on the sample breakage time and the sensitivity of the sample with a fastest progress of the stress corrosion cracking.

5. The stress corrosion cracking evaluation method according to claim 3, further comprising a master curve creation step of creating the master curve by conducting a rupture test by using a plurality of test pieces including a similar material to the steam turbine and having different sensitivities.

6. The stress corrosion cracking evaluation method according to claim 1, further comprising a first correction step of correcting the breakage time based on a reference temperature corresponding to a master curve and a temperature during operation of the steam turbine.

7. The stress corrosion cracking evaluation method according to claim 6, further comprising a second correction step of correcting the breakage time based on a reference wetness corresponding to the master curve and a wetness during operation of the steam turbine.

8. The stress corrosion cracking evaluation method according to claim 1,
wherein the sample includes two sample materials which at least partially contact each other and are applied with a stress.

9. The stress corrosion cracking evaluation method according to claim 8,
wherein the two sample materials respectively include different materials included in the steam turbine.

10. The stress corrosion cracking evaluation method according to claim 8,
wherein a crevice is formed between the two sample materials.

11. The stress corrosion cracking evaluation method according to claim 1,
wherein the sample is a double U-bend test piece, a tapered double-cantilever beam (DCB) test piece, a blunt notch compact tension (CT) test piece, or a pre-crack CT test piece.

12. The stress corrosion cracking evaluation method according to claim 1,
wherein the sample breakage time acquisition step includes acquiring the sample breakage time based on a detection signal of a broken condition detection sensor provided in the sample.

13. The stress corrosion cracking evaluation method according to claim 1, further comprising an evaluation step of evaluating a remaining life or a maintenance timing of the steam turbine based on the breakage time.

* * * * *